July 18, 1972  C. L. BOGGS  3,677,868
LAMINATED BOARD STRUCTURE AND METHOD OF MAKING SAME
Filed Nov. 24. 1969  2 Sheets-Sheet 1
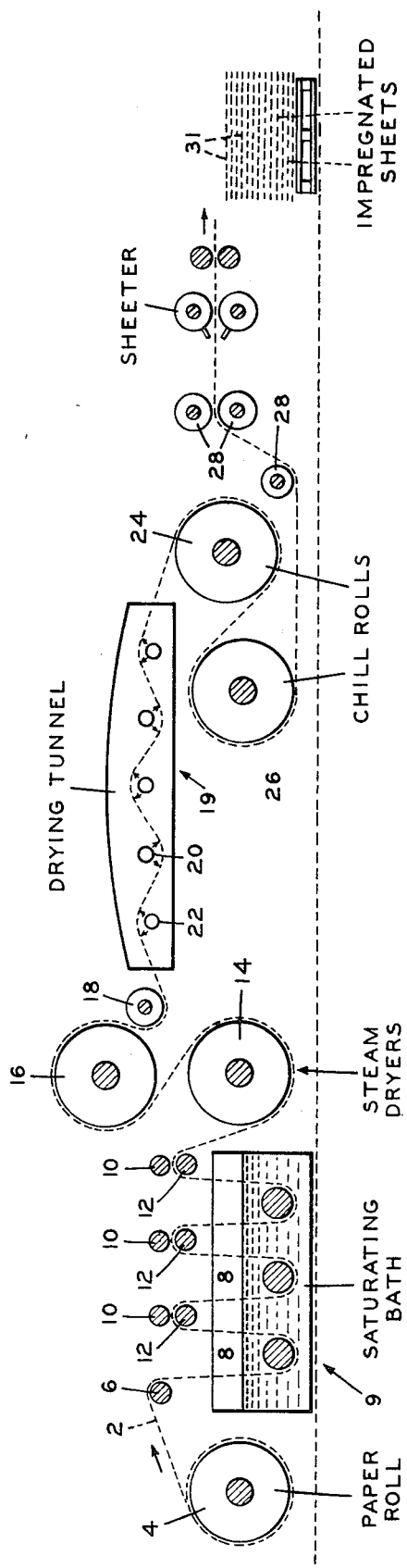

United States Patent Office 3,677,868
Patented July 18, 1972

3,677,868
LAMINATED BOARD STRUCTURE AND
METHOD OF MAKING SAME
Charles L. Boggs, Statesville, N.C., assignor to International Paper Company, New York, N.Y.
Filed Nov. 24, 1969, Ser. No. 884,454
Int. Cl. B32b 21/10
U.S. Cl. 161—37         8 Claims

ABSTRACT OF THE DISCLOSURE

A resin impregnated, resin curable fiber mat, and a method for using the mat as a dimensional stabilizing element in a laminate structure, which is partially cured prior to use in the laminate structure and is fully polymerized by the addition of suitable resin when the mat is to be used.

BACKGROUND OF THE INVENTION

This invention relates to a resin impregnated, resin curable fiber mat, the method of making the fiber mat, a laminated structure employing the fiber mat, and a method of making the laminated structure. More particularly, the invention deals with a novel resin impregnated mat which is partially cured before use and is fully polymerized with pressure and with or without the use of heat and can be employed as a dimensional stabilizing element in a laminated structure having a lumber, particle board, or a multi-ply core, or as a polymerizable single-ply or multi-ply structural sheet.

Due to a marked decrease in the availability of hardwoods, many industries which normally require fine woods have had to turn to substitute material, now made by laminating facing veneers of a fine wood or a decorative material onto lumber or particle board cores. A lumber core is made by gluing strips together along their length to form striated boards. Core boards are usually 6 to 12 times thicker than the surface veneers.

The problem encountered by using strip core boards is that each strip has a marked tendency to expand and warp across the grain when subjected to varying degrees of humidity. Surface wood veneers are normally also situated with their grains parallel to the grain of the core, thus when the core expands laterally, the pore structure of the overlaid veneer will expand. To prevent the extensive cross-grain expansion of the core and consequently the surface veneer, laminate elements called cross-bands are bonded to either side of the core board. Facing veneers are applied over the cross-bands. These cross-bands are normally thin sheets of wood. Their grain is situated so as to go across the grain of the core. Wood's maximum strength line runs with the grain; therefore, a relatively thin cross-band is capable of controlling the cross-grain expansion of a core.

A cross-band is also used to mask imperfections such as glue lines, knots and open grained areas in the core which might otherwise affect the surface of the facing veneer when the veneer-core laminate is consolidated under pressure and/or heat. Because of this masking function and because cross-band imperfections would also "telegraph" through, a cross-band should theoretically be very uniform. The economics of production do not permit a high degree of finishing and the resultant cross-band is not always as smooth as might be desired.

Particle board is another type of core material. It is subject to omnidirectional expansion relatively equal in all directions. Because cross-bands only effectively check expansion in a direction substantially parallel to their grain, there will always be a set of force vectors in particle board cores which will run parallel with the grain and will cause the core to expand in this direction. This will cause the surface veneer to check in a parallel direction.

BRIEF SUMMARY OF THE INVENTION

A highly uniform cross-band having omnidirectional strength properties to control cross-grain core expansion as well as particle board expansion has been developed. This material can affect considerable economies in the production of furniture laminates and does not require higher heat and pressure than is normally required to effectuate a laminate bond with wood cross-bands.

In this invention cellulosic fiber mat, either wet or dry, forms a matrix for a polymerizable resin impregnant. The impregnant adds the necessary interfiber bond strength and dimensional stability to the matrix. The impregnated fiber mat is partially cured prior to use and needs only the addition of a resin catalyst and pressure and/or heat. Together the mat and impregnant form a sheet which is superior in all respects to prior art cross-bands and which is both more economical and more uniform than the wood cross-bands which it replaces.

In contrast to wood cross-bands which are individually manufactured from small pieces of veneer, the cross-band of the instant invention can be produced by continuous processes which make it both more uniform and more economical.

It is an object of this invention to provide a resin impregnated, resin curable fiber mat which can be used as a cross-band in counteracting expansion stresses in strip lumber cores and particle board cores.

It is a further object of this invention to provide an impregnated sheet which is impregnated so as to contain a quantity of impregnant resin which is sufficient to yield the necessary inter-fiber binding strength to the fiber mat, not so little as to require a great deal of resin from a wood manufacturer and yet not too much as to oversaturate the mat and thereby not allow sufficient catalytic resin to be introduced by the manufacturer.

A further object of this invention is to provide a method for making a continuous impregnated sheet which is uniform and cured to a B state so as to only require polymerization of the impregnating resin when used.

It is a still further object of this invention to provide a novel laminated board structure employing the impregnated sheet and a method for fabricating the laminated board requiring the same or less heat and pressures lower than those required by prior art devices.

BRIEF DESCRIPTION OF THE DRAWINGS

FIG. 1 is a schematic representation of the method and apparatus for treating and drying the cross-band material.

DETAILED DESCRIPTION OF THE INVENTION

Figure 4A:
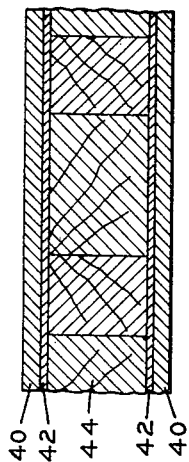
FIG. 4A is an enlarged fragmentary, cross-sectional view of the assembled laminate prior to polymerization.

There are numerous criteria which should be met in order to obtain a fiber cross-band which is satisfactory for laminating purposes. The resin must be uniformly distributed throughout the cross-band so as to result in uniform bonding and structural support over the face of the overlaid veneer. The cross-band must also be sufficiently elastic so as to conform to any irregularities in the core or facing veneer without accentuating these irregularities and causing faults in the surface veneer. The instant invention meets these criteria. Furthermore, it eliminates bleed through of resin to the surface of the facing veneer while providing a wood-fiber bond between the resin of the cross-band and the wood fibers of the core and facing which is superior to anything found in the prior art. This is primarily accomplished by the cross-band of the type herein disclosed in conjuncton with a particular resin compound employed by the furniture makers so as to yield a homogeneous layer of resin after the final polymerization step is carried out by the furniture makers.

To achieve the proper fiber bond, without having the resin bleed through the surface veneer, it is necessary to use a formulation with sufficient viscosity to permit penetration of the wood fibers without penetration of the entire thickness of the veneer. It is also necessary to have the formulation used in sufficient quantities so as to allow the subsequently applied catalytic resin to be properly absorbed, because the fiber mat increases its absorptivity after being initially impregnated.

To achieve a cross-band having the desired characteristics, heavy gauge kraft paper 2 is taken from a continuous parent roll 4. It is fed over a positioning roller 6 so as to change its direction of motion and cause it to be in a substantially vertical position. The kraft paper 2 is then immersed in a saturating bath of urea formaldehyde resin formulation which has a low viscosity and is heavily cut with solvent. The kraft paper 2 being initially in a not too absorbent state must be conditioned so as to absorb sufficient quantities of the urea formaldehyde as to render it properly impregnated. In order to accomplish this the kraft paper 2 is put through a series of pressure rolls 10, 12 intermediate its being immersed in the urea formaldehyde formulation. The heavy gauge kraft paper 2 should be selected from sheets having the following range of characteristics:

Caliper: 0.0170–0.0500 in.
Apparent density: 2.5 to 3.5 lbs. per MSF per 0.001
Basis weight: 42–155 lbs. per MSF
Finish: Machine finish, comparable on both sides
Gurley Densometer (porosity): Less than 25 sec. per 100 ml. per air
Canadian Standard Freeness: 550 to 750 CFS units
pH (Wire pit): 6.0 to 10.0
Wet strength: 10% to 25% of dry tensile strength
Water drop penetration: Less than 20 sec.
Water flotation (2" by 2" specimen): Less than 40 sec.
Moisture content: 6% to 15%
Fiber composition: Cellulosic The caliper of the base sheet is measured in inches. The base sheet must be thick enough to be effective as a cross-band and provide the necessary bulk to the portions of the laminate.

Apparent density and basis weight are measures of the fiber content of the base sheet. Sufficient fiber must be present to form a matrix for the retention of resin and provide strength to the uncured sheet as well as the finished product. Apparent density is expressed in pounds per thousand square feet per one-one-thousandths inch of thickness. Basis weight is a term generally used to express paper weight. It is measured in terms of pounds per thousand square feet.

The Gurley Densometer readings are a measure of the porosity of the sheet and, along with water drop penetration and water flotation, are a measure of the base sheet's ability to absorb resin. A Gurley Densometer reading is expressed in the time necessary to pass one hundred milliliters of air through a standard area of fibrous web at a standard pressure drop across the paper.

Water drop penetration is the time necessary for a drop of water under standardized conditions of size, temperature, and purity to penetrate a sample of the fibrous web. Water flotation is expressed in the time necessary for a standard size piece of fiber mat (2" by 2" specimen) floating on the surface of water under standard conditions of pressure and temperature to absorb enough of the water to "wet out."

Standard Canadian Freeness and pH are tests made on the pulp which will ultimately be formed into the base sheet. Both are tests which are well known in the papermaking industry. Freeness is a measure of the rate at which water drains from a stock suspension on a wire mesh screen or perforated plate. It is measured in standard units of freeness.

The general criteria which must be kept in mind when choosing a base sheet is that the base sheet must be thick enough to be effective as a cross-band and provide the necessary bulk to the other portions of the laminated structure and yet must not be so thick as to require inordinate amounts of urea formaldehyde or catalytic resin. It is also important that there be sufficient fiber to form a matrix for the retention of the resin and to provide support for the uncured sheet as well as strength to the finished product. Many prior art sheets were not satisfactory since they would not pass through the glue rolls or provide enough matrix support for the resins and catalysts. It is preferable that a similar finish be used on both sides of the sheet, so as to minimize the probability of selective penetration.

In a preferred embodiment of the apparatus for manufacturing the cross-band material there is shown a plurality of submersion rollers 8. Intermediate the submersion rollers are squeezing rollers 10, 12. The excess resin which is picked up in the saturating bath should be eliminated from the surface and forced into the inter-fiber matrix of the impregnated kraft paper 2. It is important to remember that all fiber materials of this variety have a reluctance to absorb fluids when they are in a completely dry state; however, once they have been initially wetted there is an increased tendency to absorb fluids. It is therefore important to carefully regulate the quantity of impregnating resin which is allowed to seep into the fabric interstices of the kraft paper. As has been stated above, too much resin will leave insufficient interstitial room for the final catalyst, whereas too little will result in a cross-band which is not sufficiently receptive to the catalyst and will not absorb sufficient quantities to yield a uniform bond across the laminate.

From the saturating bath 9, the kraft paper 2 passes around a set of twin steam dryers 14, 16 to eliminate some of solvent prior to the final drying steps. It then passes under a placing roller 18 which places the sheet at the same level as the drying tunnel generally labeled 19. The drying tunnel 19, employed in the preferred embodiment is a Roto-Flow Drying Apparatus which embodies the principal of flotation of the member to be dried. The impregnated kraft paper assumes a snake-like orientation between the upper 20 and lower 22 drying ports. It is important that the drying step be carried out in a controlled manner so as not to polymerize the resin, but only to partially cure it. As will be shown later, the polymerization takes place during the final laminate manufacturing step, which is one reason why the instant invention is a great improvement over the products of the prior art.

The sheet exits from the drying tunnel 19 and is passed over a set of chill rollers 24, 26 so as to cool down the sheet and partially solidify the resin-fiber cross-band. A roller combination sets up the impregnated kraft paper and feeds it to a sheeter, where it is cut into sheets of the appropriate length. The resultant is a veneer sheet impregnated with resin in a B-cured state. It has the following general specifications:

Caliper: 0.010 in.–0.050 in.
Apparent density: 2.75–4.30 lbs. per MSF per 0.001 in.
Basis weight: 55–210 lbs. per MSF
Resin pick-up: 5% to 60%
Moisture content: 1% to 15%
Gurley Densometer (porosity): Less than 25 sec. per 100 ml. per air
Water drop penetration: Less than 15 sec.
Water flotation: Less than 30 sec.

After the kraft paper is impregnated and just prior to cutting the continuous sheet into a set of sheets of a predetermined length, an indicating line may be stenciled along one face of the impregnated kraft paper in the machine direction. The machine direction of the impregnated kraft paper has a tensile strength which is up to 30% stronger than the tensile strength perpendicular to the machine direction. The marking is not essential since, as was stated previously, the strength factors of the impregnated sheet are essentially omnidirectional. The marking is primarily as a convenience for the manufacturer so that he is given the option of a slightly greater tensile strength in one direction than in the other, if the need should arise.

After the sheet has been partially cured, cut, and marked it will have a much higher absorption rate than the original sheet. This is extremely advantageous because if the absorption rate is below the desired level, the furniture maker's resin will take too long to be absorbed and too much will be needed in order to fully polymerize the urea formaldehyde.

Figure 3:
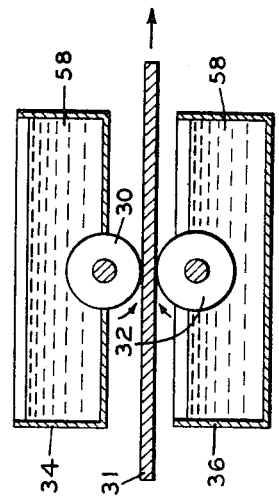
FIG. 3 is a schematic representation of the method required for fabricating the laminated structure.

Referring now to FIG. 3, there is shown a dual gluing roller combination which can be employed to distribute the urea formaldehyde resin containing the catalyst onto both faces of the impregnated mat. A roller assembly 30, 32 is designed to exert sufficient pressure on the cross-band 31 to force a uniform quantity of urea formaldehyde 58, held in trays 34, 36 into the cross-band 31. The urea formaldehyde resin containing the catalysts is distributed uniformly, and because the crossband has been dried and previously impregnated it is capable of absorbing the requisite amount of catalytically activated urea formaldehyde. It is important that the urea formaldehyde and catalysts absorbed by the impregnated sheet be sufficient to cause total polymerization of the previously inserted resin, and yet will not be so much as to bleed out when the surface veneers are placed on the cross-band.

FIG. 4A is an enlarged view of the laminate structure prior to polymerization. The upper layer 40 is a hardwood which constitutes the finishing top. Walnut, pecan, mahogany, and other woods are highly desirable for this. Resin impregnated, urea formaldehyde and catalyst coated cross-band 42 is placed between veneer 40 and core 44. The core stock 44 is made of strips of wood. It should be noted that the core stock grain normally runs in the same direction as the facing veneers grain. This stack is placed in a press along with a number of other stacks at a pressure of 150 pounds at 240° to 260° or 175 pounds at room temperature and maintained there for 24 hours if the lamination is to take place at room temperature or for from 2 to 6 minutes if it is to be completed with heat and pressure.

As can be seen, the most delicate type of wood can be used as facing sheets, with the cross-bands of this invention and may be cold pressed or pressed at sufficiently low temperatures so that there will be no fear of causing "blowing" of the laminate or other surface injury due to excessive heat.

Figure 4B:
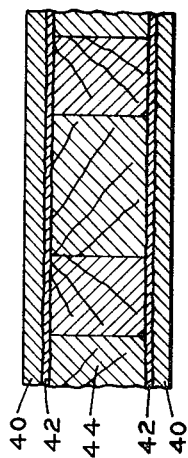
FIG. 4B is an enlarged fragmentary, cross-sectional view of the polymerized laminated structure.

Referring now to FIG. 4B, there is shown the assembled structure depicting the fact that the impregnated resin has been catalyzed by the catalyst in the coating. Thus, a bond is formed between the layers of the laminate and because of the compatability of the coated and impregnated resin a molecular bond is achieved between the coated and impregnated resin. This indicates that it is no longer necessary to rely on the tensile strength of either the paper cross-band or the prior art wooden cross-bands to achieve a rigid molecular spacer which serves as a strong bond. In the present instance, the resin is the primary strength factor and bonding element. The cross-band forms such an adhesive bond between the facing veneer and the core that it is no longer possible to break away the impregnated kraft paper from the facing veneer or the core. The layer is no longer a fiber matrix, but rather a hardened resin infra-structure, integrally bonded to both the upper facing sheet and the inner core, thereby bonding the two together.

Figure 2:
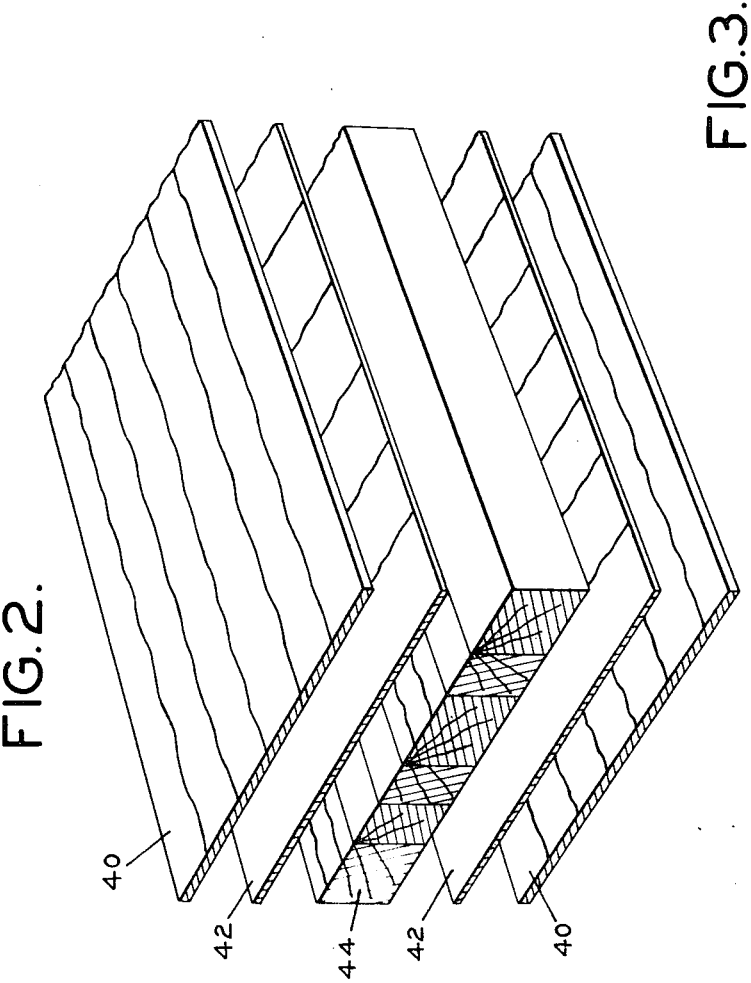
FIG. 2 is an exploded cross-sectional view of the laminate structure.

The following is a typical example of the cross-band (FIG. 2) itself and one method for manufacturing the cross-band and the laminate structure. The base web is kraft paper having the following characteristics:

Caliper: 0.030±0.001 in.
Apparent density: 3.00 lbs. per MSF per 0.001 in.
Basis weight: 90 lbs. per MSF±3 lbs. per MSF
Finish: Dry finish both sides
Gurley Densometer (porosity): 8 sec.±4 sec.
Canadian Standard Freeness: 700±20 CSF unit
pH (Wire pit): 8.5±5
Wet tensile strength: 17% to 20% of dry strength
Water drop penetration: 5±2 sec.
Water flotation (2" by 2" specimen): 8 sec. plus 4 sec.
Moisture content: 5% to 12%
Fiber composition: Cellulosic The kraft paper is supplied to an impregnator and dryer unit disclosed above.

The caliper requirements set forth met the final 1/24" thickness specifications set forth by most furniture manufacturers. Wider specification variations can be accomplished by mechanical means and the final properties of the cross-band, that of being a stable, completely polymerized urea formaldehyde sheet, could be accomplished even if the ranges were not strictly adhered to.

The impregnating resin is a bath of 32.5% by weight of urea formaldehyde resin, 20% by weight of ethyl alcohol (methyl or other alcohols can be substituted) and 47.5% by weight of water with saturate temperatures ranging from 140° to 160°. The above percentages are not meant to be exclusive but rather are merely indicative of ranges which can be used and are not meant to be delimiting. The percentage of alcohol is only 20% to minimize the fire hazard during heating. Because urea formaldehyde has greatly reduced viscosity with small additions of water, the water can be substituted to a small degree for the alcohol to minimize the fire danger. The resultant product should contain at least 30 to 50 pounds of dried urea formaldehyde resin per thousand square feet. Exceeding this level does not provide for a better bond and indeed can result in there being insufficient interstitial space left for the catalyst which will be applied with the urea formaldehyde during the furniture manufacturing process. Too little dry urea formaldehyde will mean that the end product will not be sufficiently absorbent or effective in use and will require excessive quantities of urea formaldehyde and catalysts at the manufacturing end. It is preferred to keep the moisture content at between 5% and 12%. If the water level is too low the cross-band will become brittle and hard to handle. If the moisture content is too high the veneers can be damaged. Examples of formaldehyde resins which may be used are Perkins Glue L 100; manufactured by the Perkins Glue Co. or equivalent urea formaldehyde solutions.

After impregnating the sheet with the solution above mentioned, the resultant impregnated mat is passed around a first and second steam heated dryer roller to eliminate a portion of the alcohol and then through an impregnator dryer as discussed previously. Once the impregnated mat has been properly dried and cooled it can be cut into sheets of desired lengths. The impregnated cut sheets formed from kraft paper of the stated specifications will have the following specifications:

Caliper: 0.037±0.002 in.
Apparent density: 3.5 lbs. per MSF per 0.001 in.
Basis weight: 133±2 lbs. per MSF
Resin pickup: 40±5%
Moisture content: 9±3%
Gurley Densometer (porosity): 7.5±2 sec.
Water drop penetration: 2.2 to 2.4 sec. max.
Water flotation: 3 to 4.1 sec. max.

The chemical interaction as a result of this curing, yields a partially cured, partly polymerized, but not cross-linked resin impregnated mat. At this point the cross-bands are ready to be shipped. They are slightly polymerized, have been partially cured, and have a large number of long, linear molecules. When the furniture manufacturer wishes to use the cross-band, he can pass the cross-band through a set of resin application rollers, having upper and lower resin troughs and capable of depositing resin on both the upper and lower surfaces. The formula found in the resin receptacles is by weight approximately 100 parts urea formaldehyde to—

25 parts water
4 parts shell flour
1½ parts ammonium hydroxide (aqueous ammonia)
2 parts ammonium chloride.

The urea formaldehyde constitutes the resin while the ammonium hydroxide and ammonium chloride combination constitute the polymerizing catalysts. This formula should be adhered to closely, in that any variation in the viscosity of more than 5 to 6 seconds on a #3 Zahn Cup, will result in a noticeable deterioration in the quality of the final laminate. Although the full chemical reaction is not completely understood, it is generally felt that the ammonium hydroxide acts as a buffering agent and is actually involved in the catalyzation. The alkaline aqueous ammonia flashes in the presence of heat and gaseous ammonia, $NH_3$, is formed. It is therefore possible to postulate that there must be free hydrogen ions (H+). These in the presence of the urea formaldehyde resins aid in the polymerization since the presence of the H+ ions results in essentially acidic conditions.

At the A stage, the product is water soluble. At the B stage it is water dispersible. At the C stage the final product is a rigid, indiffusible water insoluble resin. Although a certain modicum of heat may be helpful in the curing process, as well as pressure, neither high heat nor more than moderate pressure is needed to effectuate the total polymerization lamination. Although the above examples constitute the preferred embodiments of the invention, it is to be merely illustrative and are in no way meant to limit the range of equivalents which may be used within the range and spirit of the invention.

What is claimed is.

1. A laminated structure comprising a surface veneer, a core board, and a fiber mat juxtapositioned between said surface veneer and said core board said fiber mat having been impregnated with two resinous coatings, one a resinous coating to provide an interfiber bond strength between the fibers in the mat, and a second resinous coating including a polymerization catalyst to provide a bond between said veneer, mat and core board.

2. The method of fabricating a laminated structure comprising the steps of partially impregnating a fiber mat with a first coat of a resinous material, partially drying and curing the impregnated fiber mat to a point where the absorptivity of the fiber mat is sufficient to effectively absorb further resinous material, applying a second coat of polymerization catalyst carrying resinous material to the impregnated mat, and, applying said impregnated mat intermediate a veener and a core board such that it is in intimate contact with both the veneer and the core board, and then polymerizing the resinous coatings.

3. The method of fabricating a laminated structure according to claim 2 wherein the polymerization catalyst is in liquid form and is transmitted throughout the fiber mat by means of said second resinous coating applied immediately prior to positioning the fiber mat between the core board and the surface veneer, said polymerization catalyst being capable of fully polymerizing both the resin previously impregnated in the fiber mat and the second resinous coating to advance and complete the cure of the impregnated resin in addition to forming a bond between said fiber mat and said core board and veneer.

4. The method according to claim 2 wherein compressing force and heat are applied to the mat, veneer and core board to polymerize the resinous coatings.

5. A laminated structure according to claim 1 wherein the fiber mat is a cellulosic fiber mat.

6. A laminated structure according to claim 1 wherein the resin in the coatings is urea formaldehyde.

7. A method according to claim 2 wherein the fiber mat is a cellulosic fiber mat.

8. A method according to claim 2 wherein the resin in the coatings is urea formaldehyde.

References Cited
UNITED STATES PATENTS

| | | | |
|---|---|---|---|
| 2,068,759 | 1/1937 | Nevin | 156—315 |
| 3,234,074 | 2/1966 | Bryant | 161—36 |
| 3,502,533 | 3/1970 | Reiss | 117—76 PX |
| 3,503,833 | 3/1970 | Carlson | 161—39 X |
| 2,739,081 | 3/1956 | Wohnsiedler et al. | 117—76 PX |
| 3,200,008 | 8/1965 | Holtschmidt et al. | 117—76 PX |

PHILIP DIER, Primary Examiner

U.S. Cl. X.R.

52—309, 622; 117—76; 156—315; 161—41, 56

PO-1050
(5/69)

UNITED STATES PATENT OFFICE
CERTIFICATE OF CORRECTION

Patent No. 3,677,868   Dated July 18, 1972

Inventor(s) Charles L. Boggs

It is certified that error appears in the above-identified patent and that said Letters Patent are hereby corrected as shown below:

Column 4, line 35, "fabric" should be --fibric--.

Column 4, line 49, "principal" should be --principle--.

Signed and sealed this 9th day of January 1973.

(SEAL)
Attest:

EDWARD M. FLETCHER, JR.
Attesting Officer

ROBERT GOTTSCHALK
Commissioner of Patents